Nov. 17, 1953

T. A. RICH 2,659,865

SNAP ACTION ELECTROMETER

Filed Feb. 9, 1950

Inventor:
Theodore A. Rich,
by Paul A. Frank
His Attorney.

Nov. 17, 1953 — T. A. RICH — 2,659,865
SNAP ACTION ELECTROMETER
Filed Feb. 9, 1950 — 6 Sheets-Sheet 2

Inventor:
Theodore A. Rich
by Paul A. Frank
His Attorney.

Nov. 17, 1953 T. A. RICH 2,659,865
SNAP ACTION ELECTROMETER
Filed Feb. 9, 1950 6 Sheets-Sheet 3

Inventor:
Theodore A. Rich,
by Paul A. Frank
His Attorney.

Nov. 17, 1953 — T. A. RICH — 2,659,865
SNAP ACTION ELECTROMETER
Filed Feb. 9, 1950 — 6 Sheets-Sheet 4

Inventor:
Theodore A. Rich,
by Paul A. Frank
His Attorney.

Nov. 17, 1953

T. A. RICH 2,659,865

SNAP ACTION ELECTROMETER

Filed Feb. 9, 1950

Inventor:
Theodore A. Rich,
by Paul A. Frank
His Attorney

Patented Nov. 17, 1953

2,659,865

UNITED STATES PATENT OFFICE 2,659,865

SNAP ACTION ELECTROMETER

Theodore A. Rich, Schenectady, N. Y., assignor to General Electric Company, a corporation of New York Application February 9, 1950, Serial No. 143,276

26 Claims. (Cl. 324—109)

1

This invention relates to improvements in electrometers, and in particular to electrometers having a snap action.

An object of the invention is to provide improved electrometers notable for their simplicity, ruggedness and economical construction.

Sensitive, low-capacity electrometers for measuring moderate voltages are especially needed for radiation detection and monitoring. The elements of such electrometers must be spaced very closely together, since the electrostatic forces available at low and moderate potentials are small, and decrease rapidly with increasing distance between the elements. In such cases, therefore, with conventional electrometers in which one of the electrical elements moves by an amount related to the potential difference to be measured, the amount of movement to be observed is usually very small. Optical magnification systems may be employed to permit observation of the small movements, but these add to the complexity and expense of the instrument.

This invention provides electrometers in which an electrical conductor undergoes a relatively large snap-action movement upon application thereto of an opposing force of sufficient magnitude to overcome electrostatic attraction due to the potential difference measured. The magnitude of such opposing force required to produce the snap-action movement is determined as hereinafter explained. It has been found that use of this principle permits the construction of reliable electrometers which are simple, rugged, and more economical to manufacture than conventional instruments.

Other objects and advantages of the invention will appear as the description proceeds.

The features of the invention which are believed to be novel and patentable are pointed out in claims which form a part of this specification. For a better understanding of the invention, reference is made in the following description to the accompanying drawings, in which

2

Figures 1, 3:
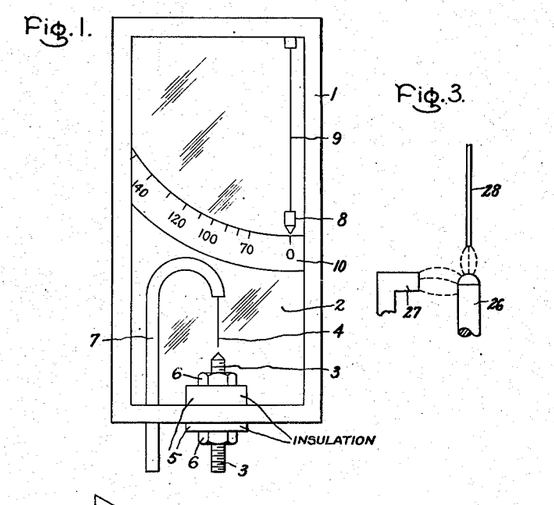
Fig. 1 is a front elevation of a snap-action electrometer embodying principles of this invention.
Figs. 3 and 4 are schematic diagrams which illustrate the effects of a shielding conductor upon the electrostatic forces.

Referring now to Fig. 1, the electrometer comprises a case 1, preferably of metal, which has a front portion 2, preferably of glass which has been treated to make it electrically conductive. Inside the case are a fixed conductor 3 and a movable conductor 4 which constitute the principal electrical elements of the electrometer. Conductor 3 may be a small metal rod which extends through the bottom of the case and is insulated therefrom by insulating bushing 5. Two nuts 6 hold the rod in place.

Conductor 4 is a small, electrically conductive, flexible filament, such as a small quartz fibre which has been metallized by sputtering, evaporating, or otherwise applying thereon a thin metallic coating. One end of this filament is attached to suitable supporting means, which may be a metal rod 7 attached to and extending through the bottom of case 1. In its normal or rest position, filament 4 extends vertically from rod 7 toward conductor 3, so that the free end of the filament is near but not in contact with the fixed conductor. This free end can move away from conductor 3 by a bending of the flexible filament. The width of filament 4 in the direction of its movement is small, and preferably is less than the minimum distance between the end of the filament and conductor 3.

When the electrometer is tilted, gravity tends to move the free end of filament 4 away from conductor 3. The component of force which tends to produce this movement is a function of the angle of tilt. Suitable means is provided to indicate the angle of tilt, such as a plumb bob 8, suspended by line 9 from the top of case 1. Bob 8 moves along a scale 10, which may be calibrated in volts or other suitable units, as hereinafter explained.

In the operation of this instrument, potential differences to be measured are applied between rods 3 and 7, and hence between the upper end of rod 3 and the lower end of filament 4. Thereby, electric charges of opposite polarity are provided on rod 3 and the filament. These charges produce an electrostatic attraction which tends to hold the lower end of filament 4 near the upper end of rod 3. The electrometer is then tilted so that gravity tends to pull the lower end of filament 4 away from rod 3, and thus provides a force which opposes the electrostatic attraction. As the angle of tilt is increased, the force tending to move the filament increases until a point is reached at which this opposing force is sufficient to overcome the electrostatic attraction. At this point, the lower end of filament 4 snaps away from conductor 3 in a sudden and very obvious manner. The angle of tilt necessary to produce such snap action is a measure of the unknown potential difference. This angle is indicated by the position of bob 8 along scale 10 when the snap action occurs. If scale 10 is calibrated in volts, a direct reading can be obtained of the magnitude in volts of the unknown potential difference.

When the electrometer is to be used as a dosimeter or radiation monitor, it is initially charged to some reference voltage: 150 volts, for example. If rod 3 is well insulated, subsequent decreases in the amount of charge are a function of the amount of radiation to which the instrument has been exposed, as is well known. The remaining charge can be measured at any time simply by tilting the instrument and observing the indicated voltage at which the snap action occurs. Since making such a reading does not change the amount of electrical charge, readings can be repeated as often as desired. When the instrument is to be used for this purpose, scale 10 may be calibrated in units of radiation exposure. Also, a sleeve or cap covering the lower end of rod 3 may be provided to prevent accidental discharge by touching rod 3.

Figure 2:
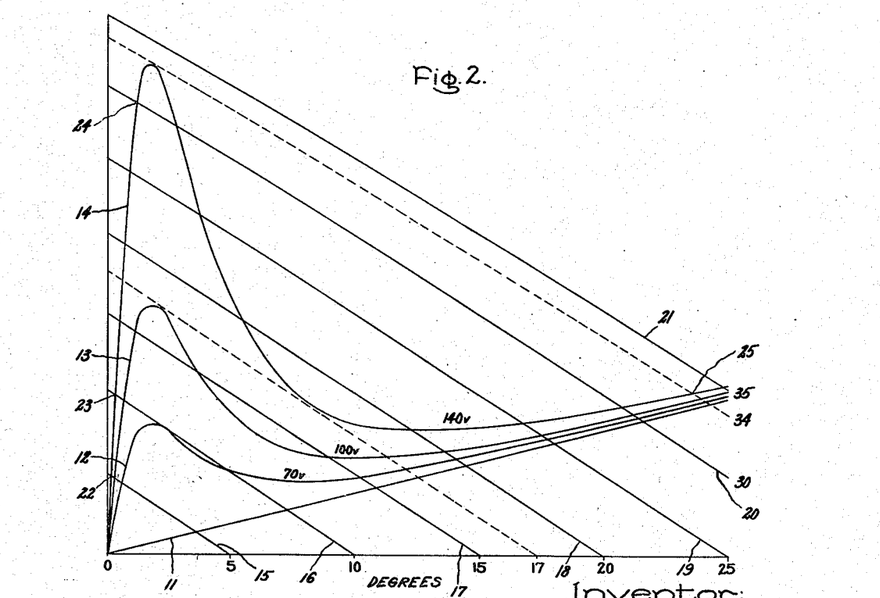
Fig. 2 is a graph which will be used in explaining the operation of this electrometer.

For a better understanding of the principle of operation of this electrometer, refer now to Fig. 2, which is a graph of operating characteristics for an electrometer of the type described having certain design values. Curves 11, 12, 13 and 14 represent the relative magnitudes of forces which tend to restore filament 4 to its rest position near conductor 3, plotted against degrees displacement away from this position. Curve 11 represents the mechanical force due to the stiffness of the filament, and thus represents the total restoring force when there is no potential difference between filament 4 and fixed conductor 3. When there is a potential difference between the two conductors, a force due to electrostatic attraction is added to the mechanical force. The sum of these two forces at 70 volts potential difference is represented by curve 12.

It may be noted that the free end of filament 4 moves along an arcuate path which, within the portion of such path nearest the fixed conductor, is substantially perpendicular to the shortest line between such path and conductor 3. Thus, when filament 4 is directly over conductor 3, the effective electrostatic force tending to hold the filament in this position is zero, because, although the electrostatic attraction is actually a maximum at this point, it is perpendicular to the direction in which the filament may move, and hence has no component in the direction of such motion. As the free end of filament 4 is displaced from conductor 3, the component of electrostatic force in the direction of motion increases relative to the total electrostatic force, but the total electrostatic attraction decreases because of the increased distance between the two conductors. Therefore, the effective component of force opposing the displacement increases during small displacements of filament 4. With larger displacements, the effective electrostatic attraction decreases. This is quite evident from the shape of curve 12, which increases in value up to a displacement of about two degrees, whereupon the curve passes through a maximum and then approaches curve 11 asymptotically.

Curve 13 represents the total forces acting when the potential difference is 100 volts, and curve 14 represents such forces when the potential difference is 140 volts. Curves 15 through 21 represent the force of gravity tending to move filament 4 away from conductor 3 at various angles of tilt. Curve 15 represents the effective gravity force at a tilt of five degrees. These curves slope downward to the right because any displacement of the filament reduces the effective angle of tilt so far as the filament is concerned. For example, if the electrometer is tilted five degrees and the filament is displaced downward five degrees, the filament is vertical and there is no effective gravity force tending to move it any further. Therefore, curve 15 has a value of zero at five degrees displacement. Similarly, curves 16 through 21 represent tilts, at five degree intervals, of ten degrees through thirty-five degrees, respectively.

Stable positions which filament 4 can assume under any given conditions are represented by intersections of the appropriate curves. For example, if conductors 3 and 4 are charged to a potential difference of 140 volts, and the electrometer is tilted five degrees, the free end of filament 4 is displaced by the very small amount represented by point 22, located at the intersection of curves 14 and 15. If the electrometer is tilted ten degrees, the displacement is slightly greater but still very small, as represented by point 23 at the intersection of curves 14 and 16, and if the angle of tilt is increased to thirty degrees, the displacement is still small as represented by point 24 at the intersection of curves 14 and 20. However, if the angle of tilt is increased to about thirty-four degrees, the "hump" or maximum value of curve 14 is passed, and the filament suddenly snaps over to a relatively large displacement of about twenty-four degrees, represented by point 25. This snap-action movement is relatively large and obvious and easily observed. When the snap-action occurs, the position of plumb bob 8 along scale 10, Fig. 1, is observed. If the instrument is properly calibrated, this position is marked 140 volts.

In a similar manner, it can be observed that a snap action occurs at approximately 17 degrees tilt when the potential difference is 100 volts, and at approximately 10 degrees tilt when the potential difference is 70 volts. It will be appreciated that the particular values represented by the curves of Fig. 2 are illustrative only, and that different values can be obtained by varying the size and spacing of the conductors, or the stiffness of the filament, to obtain electrometers having different sensitivities for making measurements in different voltage ranges.

Shielding may be employed to improve the snap-action at the smaller angles of tilt corresponding to smaller potential differences. In Fig. 2, for example, it may be noted that the slope of curve 12 on the right-hand side of the hump is almost the same as the slope of curve 16; and therefore, for an electrometer having operating characteristics represented by Fig. 2, with a 70 volt potential difference the snap-action obtained is not so crisp and clear-cut as that at the higher voltages, and at potential differences smaller than 70 volts the snap action may be quite unsatisfactory.

Figure 4:
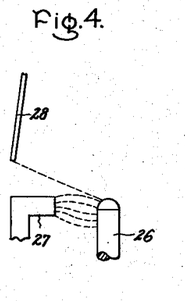

This situation can be greatly improved by providing a second fixed conductor a short distance from the first in the direction in which the filament moves, and electrically connecting this second fixed conductor to the filament so that both are at the same potential. The second conductor then acts as a partial electrostatic shield which substantially decreases the electrostatic attraction acting upon the filament after it has moved past the second conductor. This may be better understood by referring to Figs. 3 and 4. In these two figures, the first fixed conductor is represented at 26, the second fixed conductor at 27, and the filament at 28. The potential difference to be measured is applied between conductor 26 and filament 28, while conductor 27 is at the same potential as filament 28.

When filament 28 is directly over conductor 26, the electrostatic lines of force from conductor 26 may be divided between conductor 27 and filament 28 in relatively equal proportion, as illustrated by the broken lines in Fig. 3. When filament 28 moves away from conductor 26, some of the lines of force shift to conductor 27, because it is closer, as illustrated by the broken lines in Fig. 4. This greatly reduces the electrostatic attraction acting upon filament 28.

Figure 5:
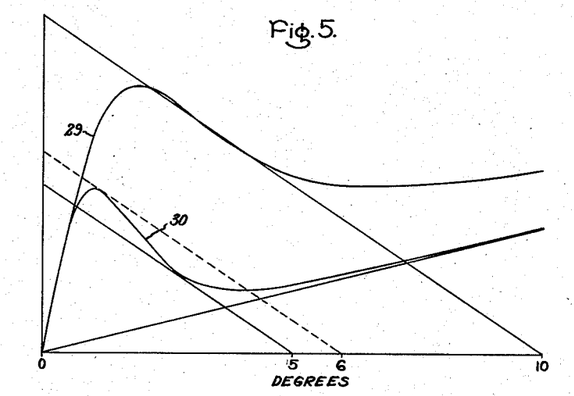
Fig. 5 is a graph which illustrates the effect of such shielding on the operation of the electrometer.

Refer now to Fig. 5, which is a graph illustrating the effects of shielding upon the operation of the electrometer. Curve 29 represents the restoring forces acting upon the filament without shielding, and curve 30 represents these forces with a certain degree of shielding. From curve 29, it is apparent that snap action becomes somewhat sluggish and unsatisfactory at angles of tilt less than about ten degrees, whereas curve 30 shows that with shielding, everything else remaining the same, a very crisp snap-action can be obtained at a tilt angle of six degrees or less.

Figure 6:
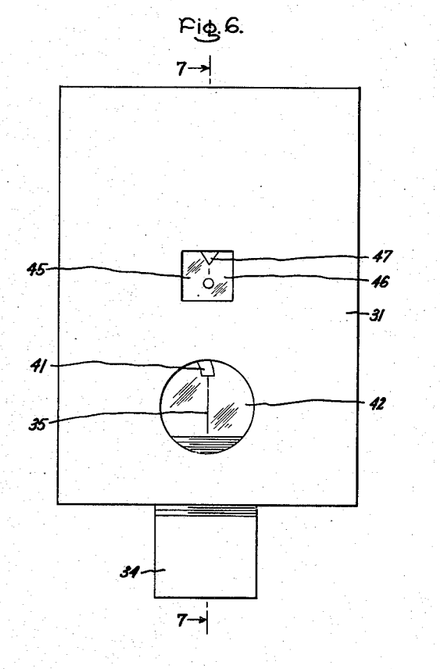
Fig. 6 is a front elevation of another snap-action electrometer.
Figure 7:
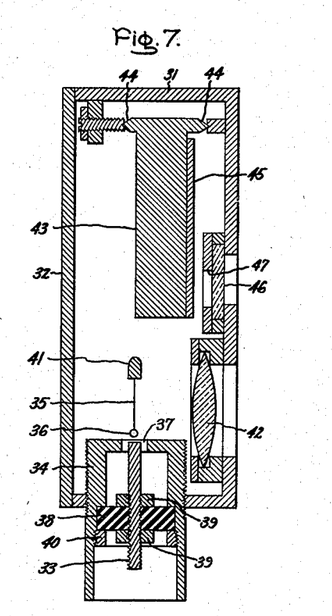
Fig. 7 is a section along line 7—7, Fig. 6.
Figure 8:
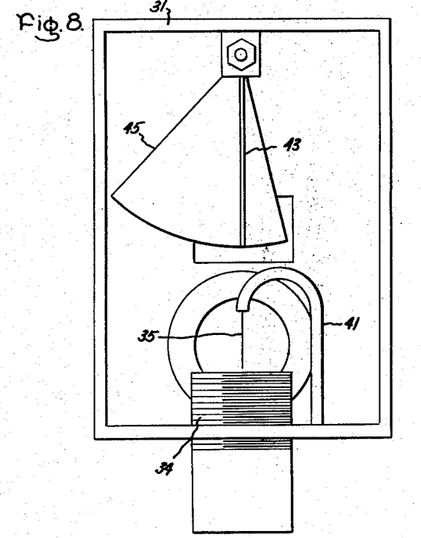
Fig. 8 is a rear elevation of the same electrometer with the back cover removed.

Refer now to Figs. 6, 7, and 8 which show another electrometer embodying principles of this invention. The electrometer is preferably enclosed in a metal case 31 which may have a removable back 32. The principal electrical elements are a first fixed conductor 33, a second fixed conductor or shield 34, and a small, electrically conductive, flexible filament 35, preferably a small metallized quartz fibre. The lower end of filament 35 may be formed into a loop 36, as shown in Fig. 7, to increase the electrostatic attraction between the filament and conductor 33. Conductor 34 acts as a shield to improve the operation of the instrument as hereinbefore explained.

Preferably, conductor 34 is a tube which extends through the bottom of the case and which has an opening 37 at its inner end, as shown. Conductor 33 is a small rod which is positioned coaxially within tube 34, and extends to opening 37. Rod 33 is held in place and insulated from tube 34 by an insulating bushing 38. Nuts 39 and a retaining ring 40 are provided to hold rod 33 and bushing 38 in place.

Filament 35 is attached at one of its ends to supporting means which may be a metal rod 41 attached to case 31. The filament is electrically connected to tube 34 through the supporting means and the case. Since the filament is very small, a magnifying lens 42 is preferably provided to make it easier to observe the snap action of the filament. However, this can be an inexpensive type of lens, since only the very obvious snap action is to be observed through it, and need not be an expensive, accurate optical system such as is needed to observe small movements of elements in conventional electrometers.

Indicating means responsive to the angle of tilt may comprise a vane 43 suspended from suitable bearings 44. Attached to the vane is a preferably fan-shaped scale 45 which may be observed through a glass window 46 in the front of the instrument case. Attached to the case behind the window is an index marker 47. When the electrometer is tilted, gravity causes vane 43 to remain vertical, which brings a different part of scale 45 opposite index marker 47 and visible through window 46.

Figure 9:
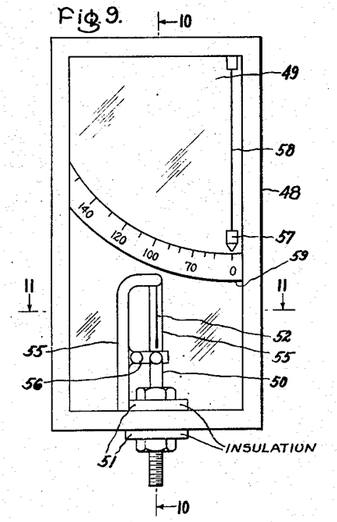
Fig. 9 is a front elevation of another snap-action electrometer.
Figure 10:
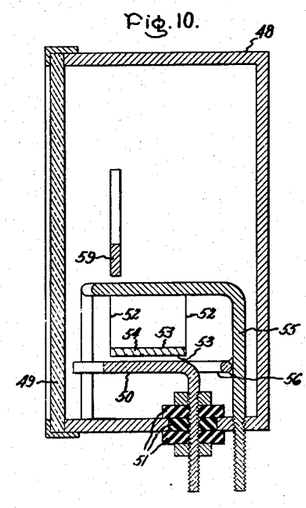
Fig. 10 is a section along line 10—10, Fig. 9.
Figure 11:
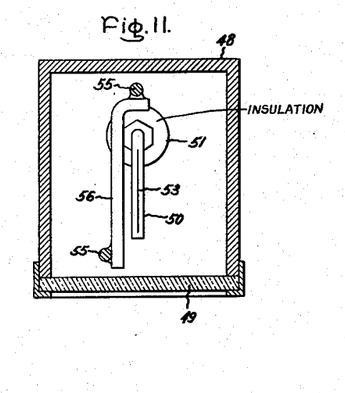
Fig. 11 is a section along line 11—11, Fig. 9.

Refer now to Figs. 9, 10, and 11, which show another electrometer embodying principles of this invention. A metal case 48 has a glass front 49 through which the electrometer elements inside the case are visible. Fixed conductor 50 is an inverted L-shaped metal rod, having a horizontal upper portion. The vertical portion of this rod extends through the bottom of the case as shown, and is insulated therefrom by insulating members 51. The movable conductor comprises two metallized quartz fibers 52, which extend in a normally vertical direction toward conductor 50. At the lower end of fibres 52 are two parallel quartz fibres 53, which form a small rectangular frame which supports a thin lacquer film 54. A metallic coating is applied to film 54 to make it electrically conductive. This arrangement provides a light-weight conductor having a relatively large surface, which provides larger electrostatic forces than would be possible with the smaller surface of a single filament.

The upper ends of filaments 52 are attached to supporting means comprising a metal rod 55 having the shape shown, which is attached to case 48. A second fixed conductor consists of a horizontal metal rod 56, the ends of which are welded or soldered to rod 55 so that rod 56 is supported parallel to and a short distance from the horizontal portion of rod 50. When the movable electrod swings away from conductor 50, it moves past conductor 56, which thereupon provides partial electrostatic shielding between the movable conductor and conductor 50, and thereby improves the operation of the instrument as hereinbefore explained. A plumb bob 57 supported by a line 58 attached to the top of the case cooperates with a calibrated scale 59 to indicate the value of potential differences measured by showing the relative amounts of tilt at which snap action of the electrometer occurs.

Figure 12:
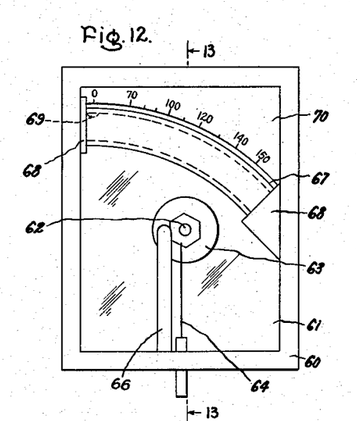
Fig. 12 is a front elevation of another snap-action electrometer.
Figure 13:
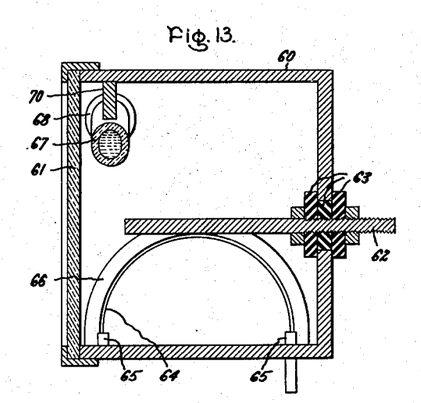
Fig. 13 is a section along line 13—13, Fig. 12.

Refer now to Figs. 12 and 13, which show another electrometer embodying principles of this invention. This electrometer preferably has a metal case 60 with an electrically conductive glass front 61. The first fixed conductor is a horizontal metal rod 62 which extends through the back of the case and is insulated therefrom by insulating members 63. The movable conductor comprises a small, electrically conductive, flexible filament 64, such as a metallized quartz fibre, which is bent into a normally vertical semicircular arc, as shown. The two ends of filament 64 are attached to and electrically connected with case 60 through supporting means comprising two small metal rods 65. Filament 64 is sufficiently stiff so that when the electrometer is held level the filament assumes an upright vertical position; but it is sufficiently flexible to bend so that its upper portion deflects noticeably under the influence of gravity whenever the electrometer is appreciably tilted. This deflection is in a direction substantially normal to the plane of the filament. Shielding is provided by a second fixed conductor comprising a semi-circular metal rod 66 attached to the case and positioned substantially concentric with filament 64. The center portion of rod 66 is spaced a short distance from rod 62, so that when the center portion of filament 64 is deflected away from rod 62 it moves past the center portion of rod 66 and thereby is partially shielded from the electrostatic attraction of rod 62.

The means responsive to the angle of tilt may comprise a small glass tube 67 bent into an arc as shown and supported within the case by brackets 68. Tube 67 is filled with liquid except for a small bubble 69. Since bubble 69 always tends to move toward the highest part of the tube, it moves along the length of the tube as the electrometer is tilted. The position of the bubble along a calibrated scale 70 when snap action of the electrometer occurs indicates the value of the potential difference measured.

Figure 14:
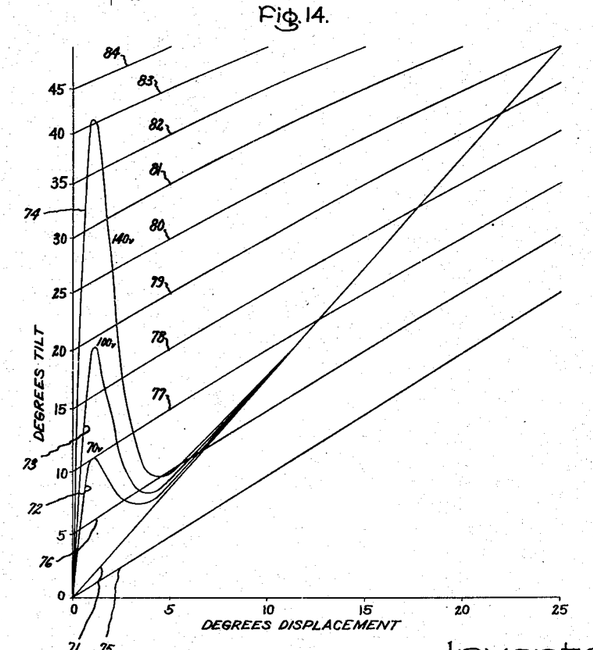
Fig. 14 is a graph used in explaining the operation of the Fig. 12 electrometer.

Refer now to Fig. 14, which is a graph illustrating the principle of operation of this electrometer. It may be noted that this graph is very similar to Fig. 2, except that the lines indicating the effective force of gravity on the filament slope upward to the right. This is because the filament is supported at its lower rather than at its upper end, so that displacement of the filament from its rest position increases the effective angle of tilt of the instrument. If the instrument were designed for operation with the filament extending downward instead of upward, the Fig. 2 curves would be applicable.

In Fig. 14, curve 71 represents the mechanical restoring force due to stiffness of the filament. This force is relatively large, as indicated by the steepness of curve 71, since the filament must be stiff enough to assume an upright position whenever the electrometer is level. Curves 72, 73, and 74 represent the total restoring forces corresponding to various values of potential difference applied between conductor 62 and filament 64. Curves 75 through 84 represent the effective gravity forces corresponding to the respective angles of tilt indicated. These curves indicate that, for particular design values of the instrument, snap action may be attained at 10° tilt with a 70-volt potential difference; at 19° tilt with a 100-volt potential difference; and at 40° tilt with 140-volt potential difference.

Figure 15:
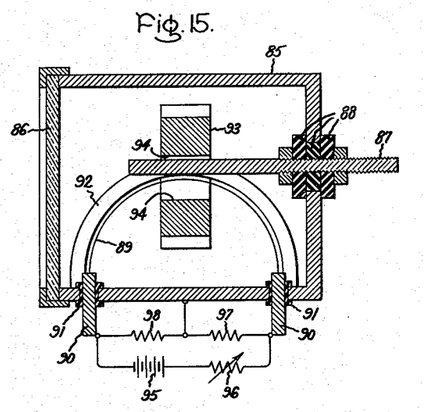
Fig. 15 is a partly schematic vertical section of another snap-action electrometer.

Other means of providing an adjustable force may be used instead of tilting the instrument. For example, electromagnetic forces may be used. Referring now to Fig. 15, the electrometer may comprise a metal case 85 having a glass front 86. A first fixed conductor is a rod 87 which extends horizontally through the back of the case and is insulated therefrom by insulating members 88. A movable conductor comprises a small metallized quartz filament 89 bent into a semi-circular arc and attached at its two ends to rods 90, which are insulated from the case by insulating members 91. A second fixed conductor preferably comprises a semi-circular rod 92 which is attached to the case and is substantially concentric with filament 89. A small permanent magnet 93 is positioned so that the center portion of filament 89 is between the magnet poles 94. The magnet provides a vertical magnetic field which is perpendicular to the center portion of the filament and to its direction of movement.

Means comprising a battery 95 and a calibrated adjustable resistor 96 in series is connected between rods 90 to provide a small, adjustable current through filament 89. A voltage divider comprising resistors 97 and 98 in series in connected between rods 90, and its center point is connected to case 85, so that the center portion of filament 89 is maintained at the same potential as case 85 and rod 92. The potential difference to be measured is applied between the case 85 and rod 87, and hence between the center portion of filament 89 and rod 87. Electrostatic attraction tends to hold the center portion of filament 89 near rod 87. Current through the filament, in cooperation with the magnetic field provided by magnet 93, produces a force which tends to move the center portion of the filament away from rod 87. The value of this current, as indicated by the adjustable calibrated resistor 96, at which snap action of the filament occurs, indicates the value of the potential difference between the filament and rod 87.

With a somewhat similar construction, the filament can be made magnetic by evaporating iron on it. Thus, the magnet exerts a force on the filament which can be varied by varying the distance of the magnet from the filament. Then the case is held stationary and the magnet brought toward the filament until it snaps. The position of the magnet is calibrated in appropriate units.

Figure 16:
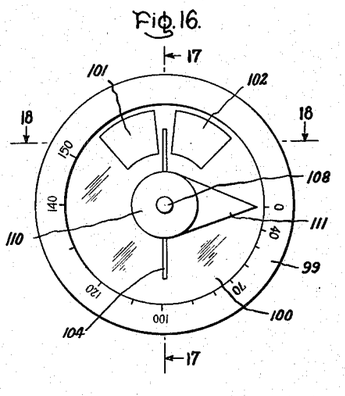
Fig. 16 is a plan view of another snap-action electrometer.
Figure 17:
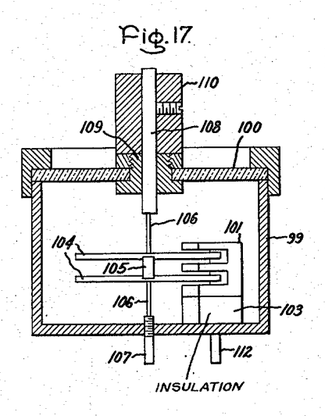
Fig. 17 is a section along line 17—17, Fig. 16.
Figure 18:
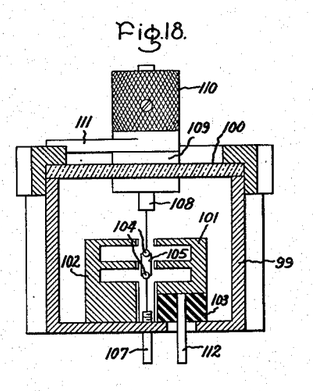
Fig. 18 is a section along line 18—18, Fig. 16.

Refer now to Figs. 16, 17, and 18, which illustrate another snap-action electrometer. The instrument is in a metal case 99 having a glass top 100. A first fixed conductor 101 and a second fixed conductor 102 each comprise a slotted metal member of the shape shown. Member 101 is electrically insulated from the case by insulation 103, while member 102 is electrically connected to the case.

The movable conductor comprises a plurality of parallel rods 104. As many rods as desired may be provided to obtain the desired sensitivity. Rods 104 are preferably made very light, and for this purpose may be constructed of very small glass tubing to which a thin metallic coating is applied to make the rods electrically conductive. Preferably, the rods are rigidly joined together by a member 105, and are supported by an elastic suspension which is preferably a small gold ribbon 106. At its lower end, ribbon 106 is attached to the case through a suitable connecting member 107; and at its upper end, it is attached to a rod 108 which extends upward through the glass top of the case. Rods 104 are electrically connected to the case through ribbon 106 and member 107. A metal bushing 109 may be provided where rod 108 passes through the glass. A knob 110 having a pointer 111 is attached to the upper end of rod 108, so that the knob may be turned to "wind up" the gold ribbon and thus increase the torque applied to rods 104 by the elastic ribbon. Pointer 111 cooperates with a scale on the top of case 99, as shown, to indicate the relative magnitude of torque so applied. Friction is sufficient to hold pointer 111 in any position to which it is set.

Preferably, ribbon 106 is attached to rods 104 at their center of gravity, which is also their geometrical center if the rods are symmetrical, as is preferable, so that gravity does not produce any torque tending to rotate the rods regardless of the position of the instrument.

When rods 104 rotate about the axis of their suspension, the outer ends of the rods pass from within the slots of fixed conductor 101 to corresponding slots in fixed conductor 102. It will be appreciated that the mechanical torque provided by the gold ribbon suspension tends to produce such movement when the ribbon is wound up by turning knob 110 clockwise. Electrostatic attraction due to the potential difference to be measured applied between conductor 101 and rods 104 tends to oppose this motion by holding the rods within the slots of conductor 101. In operation of the instrument, the potential difference to be measured is applied between connection 112, which is attached to conductor 101, and member 107; and thereby the potential difference is applied between conductor 101 and the end portions of rods 104. Knob 110 is turned clockwise until the torque provided by the elastic suspension is sufficient to overcome the electrostatic attraction, whereupon the rods move out of the slots in conductor 101 with a sudden and very obvious snap-action. The position of pointer 111 at which this snap-action occurs indicates the value of the measured potential difference.

Figure 19:
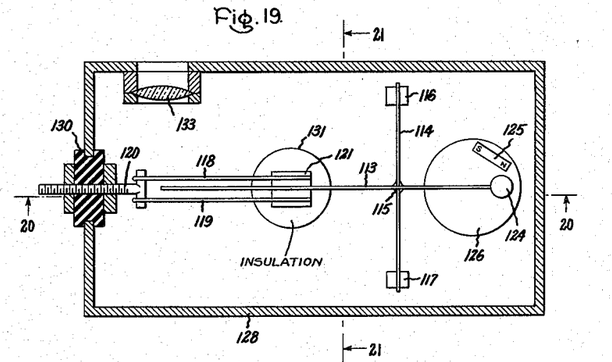
Fig. 19 is a section of still another snap-action electrometer.
Figure 20:
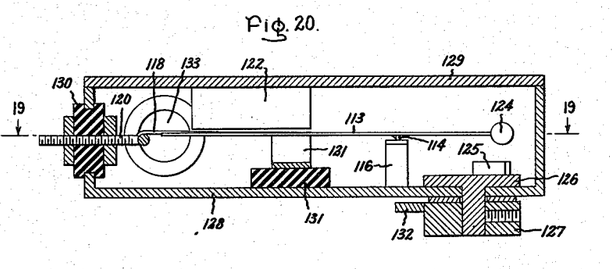
Fig. 20 is a section along line 20—20, Fig. 19.
Figure 21:
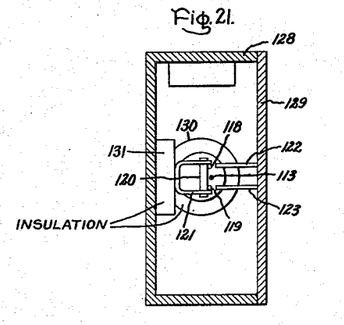
Fig. 21 is a section along line 21—21, Fig. 19.

Another snap-action electrometer is shown in Figs. 19, 20, and 21. In this electrometer, an electrically conductive filament 113 is supported by a gold ribbon suspension 114 so that the filament can rotate about an axis perpendicular to its length which passes between the ends of the filament. Preferably filament 113 is of a nonmagnetic material, such as small diameter aluminum wire.

A bit of silver cement 115 may be used to fasten filament 113 to gold ribbon 114. The gold ribbon is supported upon two posts, 116 and 117, which may be small strips of metal, preferably bent over at their tops to avoid sharp corners which might cut into the gold ribbon, and exerting a small tension outward to keep the ribbon taut.

A first fixed conductor comprises two small wires 118 and 119 supported parallel to one end of filament 113. Wires 118 and 119 define a slot into and out of which the end of filament 113 passes as the filament rotates about the axis of ribbon 114. Wires 118 and 119 may be supported at one end by a T-shaped member 120, and at the other end by a U-shaped member 121.

A second fixed conductor comprises two parallel plates 122 and 123 arranged as shown. Plates 122 and 123 define a slot into which the end of filament 113 passes upon passing out of the slot between wires 118 and 119.

Attached to the other end of filament 113 is a magnetic member 124. This magnetic member may be made of small particles of soft iron held together by a suitable binding material, in a manner similar to the powdered iron cores used in radio frequency inductors. Preferably, filament 113 and member 124 are balanced so that the force of gravity does not tend to produce rotation about the axis of ribbon 114.

A small permanent magnet 125 is positioned so that it attracts magnetic member 124 in a direction which tends to rotate filament 113 out of the slot between wires 118 and 119 into the slot between plates 122 and 123. Magnet 125 is placed at the edge of a circular member 126 which may be rotated about its center by turning a knob 127. Magnet 125 exerts the greatest force upon member 124 when the magnet is directly under the magnetic member; and as the position of the magnet relative to member 124 is changed by rotating member 126 the force of attraction decreases.

The electrometer is preferably enclosed in a metal case 128 which may have a removable cover 129. Plates 122 and 123 are electrically connected to filament 113 through the metal case, posts 116 and 117, and gold ribbon 114. Members 120 and 121 are insulated from the case by insulating members 130 and 131, respectively.

Potential differences to be measured are applied between member 120 and case 128, and thus are applied between wires 118 and 119 and filament 113. Due to this potential difference, there is an electrostatic attraction which tends to hold filament 113 within the slot between wires 118 and 119. Member 126 is initially turned to a position such that magnet 125 exerts a relatively small attractive force upon magnetic member 124.

To measure the value of the potential difference, knob 127 is turned to move magnet 125 nearer to the position of maximum attraction upon member 124. The knob is turned until the force exerted by the magnet is sufficient to rotate filament 113, and cause the filament to pass out of the slot between wires 118 and 119 and into the slot between plates 122 and 123. This movement of filament 113 occurs in a sudden and very obvious manner at a position of knob 127 which depends upon the value of the measured potential difference.

Knob 127 may be provided with a pointer 132 which cooperates with a calibrated scale on the instrument case to indicate the value of the potential difference measured. Plates 122 and 123 act as an electrostatic shield to improve the snap-action in the manner hereinbefore explained. A lens 133 may be provided to facilitate observation of one end of filament 113, for detecting the snap-action motion of the filament.

The filament can be reset to its original position by turning knob 127 back to the minimum attraction position, and rotating the case sharply, so that the inertia of the filament carries it out of the slot between plates 122 and 123.

Having described the principles of this invention and the best modes in which I have contemplated applying those principles, I wish it to be understood that the examples described are illustrative only, and that other means and modifications can be used without departing from the true scope of the invention.

I claim:

1. A snap-action electrometer comprising a fixed conductor, a movable conductor constructed for movement along a path such that the distance between said fixed and movable conductors continually increases from a predetermined minimum at the zero deflection position thereof, the area of attraction of said fixed conductor being relatively small in comparison to the attractive area of said movable conductor, electrical connections for applying a potential difference to be measured between said fixed and movable conductors, thus providing electrical charges of opposite polarity between the areas of attraction of said conductors, whereby electrostatic attraction tends to hold the movable conductor within the portion of its path near the fixed conductor, the effective component of such forces acting upon said movable conductor in the direction of its movement having a maximum value at a position of the movable conductor within that portion of its path which is near said fixed conductor, means for applying an opposing force of adjustable magnitude to said movable conductor which tends to move the movable conductor away from the fixed conductor, so that when the magnitude of such opposing force exceeds the maximum value of the effective component of the electrostatic forces said movable conductor moves away from said fixed conductor with a sudden snap action, and means to indicate the relative magnitude of such opposing force required to produce such snap action.

2. A snap-action electrometer comprising a fixed conductor, a movable conductor constructed for movement along a path such that the distance between said fixed and movable conductors continually increases from a predetermined minimum at the zero deflection position thereof, the area of attraction of said fixed conductor being relatively small in comparison to the attractive area of said movable conductor, the direction of such movement within the portion of such path which is nearest the fixed conductor being substantially perpendicular to the minimum distance line between such path and the fixed conductor, electrical connections for applying potential differences to be measured between the areas of attraction of said fixed and movable conductors, whereby electrostatic attraction tends to hold the movable conductor near the fixed conductor, means for applying an opposing force of adjustable magnitude to said movable conductor which tends to move the movable conductor away from the fixed conductor, and means to indicate the relative magnitude of such opposing force.

3. A snap-action electrometer comprising first and second fixed conductors, a movable conductor having a path of movement which passes near said first and second fixed conductors successively, electrical connections for applying potential differences to be measured between said first fixed conductor and said movable conductor, said second fixed conductor being electrically connected to said movable conductor, whereby electrostatic attraction forces tend to hold the movable conductor near the first fixed conductor, means for applying an opposing force of adjustable magnitude to said movable member which tends to move the movable conductor away from the first fixed conductor in the direction of the second fixed conductor, and means to indicate the relative magnitude of such opposing force.

4. A snap-action electrometer comprising a fixed conductor, a flexible, electrically conductive filament, means for supporting said filament so that, by bending of the filament, a portion thereof may move along a path such that the distance between said fixed conductor and said filament continually increases from a predetermined minimum at the zero deflection position thereof, the area of attraction of said fixed conductor being relatively small in comparison to the attractive area of said movable conductor, electrical connections for applying potential differences to be measured between the areas of attraction of said fixed conductor and said filament, whereby electrostatic attraction tends to hold the filament near the fixed conductor, means for applying an opposing force of adjustable magnitude to said filament which tends to move the filament away from the fixed conductor, so that when the magnitude of said opposing force becomes sufficient to overcome the electrostatic attraction said filament moves away from said fixed conductor with a sudden snap action, and means to indicate the relative magnitude of such opposing force required to produce such snap action.

5. A snap-action electrometer comprising a fixed conductor, a movable conductor, means for supporting said movable conductor so that a portion thereof may move along a path such that the distance between said fixed and movable conductors continually increases from a predetermined minimum at the zero deflection position thereof, the area of attraction of said fixed conductor being relatively small in comparison to the attractive area of said movable conductor, electrical connections for applying a potential difference to be measured between the areas of attraction of said fixed and movable conductors, whereby electrostatic attraction tends to hold the movable conductor near the fixed conductor, said movable conductor being supported so that gravity tends to move said movable conductor away from said fixed conductor when the electrometer is tilted, the effective component of gravity which tends to produce such movement being related to the angle of such tilt, and indicating means responsive to such angle of tilt.

6. A snap-action electrometer comprising a fixed conductor, a movable conductor, supporting means for the movable conductor such that the movable conductor normally extends from such supporting means toward said fixed conductor in axial alignment, the portion of said movable conductor nearest said fixed conductor being movable perpendicular to its length along a path such that the distance between said fixed and movable conductors continually increases from a predetermined minimum at the zero deflection position thereof, the area of attraction of said fixed conductor being relatively small in comparison to the attractive area of said movable conductor, so that when the electrometer is tilted gravity tends to move the movable conductor away from the fixed conductor, means to indicate the relative amounts of such tilt, and electrical connections to apply potential differences to be measured between the areas of attraction of said fixed and movable conductors.

7. A snap-action electrometer comprising first and second fixed conductors, a movable conductor, said movable conductor being electrically connected to said second fixed conductor, supporting means for said movable conductor, said conductors being so arranged that said movable conductor in its rest position extends from said supporting means toward said first fixed conductor, the portion of said movable conductor nearest the fixed conductor being movable perpendicular to its length along an arcuate path which passes near, without touching, said first and second fixed conductors successively, so that when the electrometer is tilted gravity tends to move the movable conductor away from the first fixed conductor in the direction of the second fixed conductor, means to indicate the relative amounts of such tilt, and electrical connections to apply potential differences to be measured between said first fixed conductor and said movable conductor.

8. A snap-action electrometer comprising a fixed conductor, an electrically conductive flexible filament, supporting means for supporting said filament at one of its ends, said filament being attached to said supporting means and, in its rest position, extending toward said fixed conductor in axial alignment therewith, so that the portion of said filament nearest said fixed conductor is movable, by bending of the filament upon application of force thereto, along an arcuate path such that the distance between said fixed conductor and said filament continually increases from a predetermined minimum at the zero deflection position thereof, the area of attraction of said fixed conductor being relatively small in comparison to the attractive area of said movable conductor, means to indicate the relative magnitude of force tending to move said filament away from said fixed conductor, and electrical connections for applying potential differences to be measured between the areas of attraction, of said fixed conductor and said filament.

9. A snap-action electrometer comprising a fixed conductor, an electrically conductive flexible filament, supporting means for supporting said filament at one of its ends so that said filament, in its rest position, extends vertically from such supporting means toward said fixed conductor in axial alignment therewith, whereby when the electrometer is tilted gravity tends to move the unsupported end of said filament away from said fixed conductor in a manner such that the distance between said fixed conductor and said filament continually increases from a predetermined minimum at the zero deflection position thereof, the area of attraction of said fixed conductor being relatively small in comparison to the attractive area of said filament, means for indicating relative amounts of such tilt, and electrical connections for applying potential differences to be measured between said fixed conductor and said filament.

10. A snap-action electrometer comprising a first fixed conductor, an electrically conductive flexible filament, supporting means for supporting said filament at one of its ends so that said filament, in its rest position, extends vertically from such supporting means toward said first fixed conductor, whereby when the electrometer is tilted gravity tends to move the unsupported end of said filament away from such first fixed conductor, means for indicating relative amounts of such tilt, a second fixed conductor, electrically connected to said filament, spaced from said first fixed conductor in the direction toward which said filament moves when the electrometer is so tilted, and electrical connections for applying potential differences to be measured between said first fixed conductor and said filament.

11. A snap-action electrometer comprising first and second fixed conductors electrically insulated from each other, said fixed conductors being in the form of a normally vertical, coaxially arranged rod and tube respectively, the inner end of said tube having an opening to which said rod extends, an electrically conductive flexible filament, supporting means for supporting said filament at one of its ends so that said filament, in its rest position, extends vertically from such supporting means toward said rod substantially along the extended axis of the rod, whereby when the electrometer is tilted gravity tends to move the unsupported end of said filament away from said rod, and indicating means responsive to the force occurring by reason of such tilt, said filament being electrically connected to said tube through said supporting means.

12. A snap-action electrometer comprising a fixed conductor, a movable conductor, said fixed conductor having a relatively small area of attraction in comparison to the area of attraction of said movable conductor, supporting means for said movable conductor, said movable conductor, in its rest position, extending from said supporting means toward said fixed conductor and having two flexible portions attached to the supporting means, so that by bending of such flexible portions upon application of force to the movable conductor the movable conductor can move perpendicular to its plane and away from said fixed conductor, indicating means responsive to the magnitude of force tending to produce such movement, and electrical connections for applying potential differences to be measured between said fixed and movable conductors.

13. A snap-action electrometer comprising a first fixed conductor having a horizontal rod-shaped portion, a movable conductor, supporting means for said movable conductor, said movable conductor including two filaments extending, in rest position, vertically from said supporting means toward the horizontal portion of said fixed conductor, said movable conductor also including an electrically conductive film supported between the unsupported ends of said filaments, said film being, in rest position, parallel and adjacent to the horizontal portion of said fixed conductor, so that, by bending of such flexible filaments upon application of force, said conductive film can move perpendicular to its plane and away from said fixed conductor, a second fixed conductor disposed adjacent to said conductive filament on the side thereof in the direction of movement, said second fixed conductor being maintained at the same potential as said conductive film, indicating means responsive to the magnitude of force tending to produce such movement, and electrical connections for applying potential differences to be measured between said fixed and movable conductors.

14. A snap-action electrometer comprising an electrically conductive flexible filament bent into a semicircular arc in a normally vertical plane, means for supporting said filament at both its ends, the center portion of the filament being otherwise unsupported, so that, by bending of the filament upon application of force thereto, such center portion can move perpendicular to the plane of the semicircular filament, means for indicating the relative magnitude of force tending to produce such movement, a fixed conductor having a relatively small area of attraction in comparison to the area of attraction of said filament, positioned adjacent to, without touching, the center portion of said filament when in its normal undeflected position, so that movement of the filament from such position increases the distance between said filament and said fixed conductor, and electrical connections for applying potential differences to be measured between said fixed conductor and said filament.

15. A snap-action electrometer comprising an electrically conductive flexible filament bent into a semicircular arc in a normally vertical plane, means for supporting said filament at both its ends, the center portion of the filament being otherwise unsupported, so that, by bending of the filament upon application of force thereto, such center portion can move perpendicular to the plane of the semicircular filament, indicating means responsive to the magnitude of force tending to produce such movement, a first fixed conductor positioned adjacent to, without touching, the center portion of said filament when in its normal undeflected position, so that movement of the filament from such position increases the distance between said filament and said first fixed conductor, a second fixed conductor shaped as a semicircular arc and positioned substantially concentric with said filament, so that, when the filament moves away from said first fixed conductor it passes said second fixed conductor, which thereupon acts as a partial electrostatic shield between said first fixed conductor and said filament, said second conductor being electrically connected to said filament, and electrical connections for applying potential differences to be measured between said first fixed conductor and said filament.

16. A snap-action electrometer comprising a first fixed conductor, a movable conductor, a portion of said movable conductor having a path of movement which passes near but does not contact said fixed conductor, electrical connections for applying potential differences to be measured between said first fixed and movable conductors, whereby electrostatic attraction tends to hold the movable conductor near the fixed conductor, a second fixed conductor disposed adjacent to said movable conductor on the side thereof in the direction of movement, said second fixed conductor being maintained at the same potential as said movable conductor, magnetic means for applying to the movable conductor an opposing force of adjustable magnitude which tends to move the movable conductor away from the fixed conductor, and indicating means responsive to the magnitude of such opposing force.

17. A snap-action electrometer comprising a fixed conductor, a movable conductor, a portion of said movable conductor having a path of movement which passes near but does not touch said fixed conductor, said fixed and movable conductors being electrically insulated from each other with said fixed conductor having a relatively small area of attraction in comparison to the attractive area of said movable conductor, means to provide a magnetic field perpendicular to said movable conductor and to its direction of movement, means to provide an adjustable electric current through said movable conductor, and means to indicate relative magnitudes of such current.

18. A snap-action electrometer comprising an electrically conductive flexible filament bent into a semicircular arc, means for supporting said filament at both its ends, the center portion of the filament being otherwise unsupported, so that, by bending of the filament upon application of force thereto, such center portion can move perpendicular to the plane of the semicircular filament, a first fixed conductor having a relatively small area of attraction in comparison to the attractive area of said filament positioned adjacent to, without touching, the center portion of said filament when in its normal undeflected position, so that movement of the filament from such position increases the distance between said filament and said first fixed conductor, a second fixed conductor positioned so that the center portion of said filament, upon movement away from said first fixed conductor, moves past the second fixed conductor, which thereupon acts as a partial electrostatic shield between said first fixed conductor and said filament, a magnet constructed and arranged to provide a magnetic field perpendicular to the center portion of said filament and to its direction of movement, means to provide an electric current of adjustable magnitude through said filament, and indicating means connected in responsive relation to the value of such current.

19. A snap-action electrometer comprising a slotted fixed conductor, a movable conductor, said fixed conductor having a relatively small area of attraction in comparison to the attractive area of said movable conductor, means for supporting said movable conductor so that it may swing in and out of the slots in said fixed conductor, electrical connections for applying potential differences to be measured between said fixed and movable conductors, whereby electrostatic attraction tends to hold the movable conductor within the slots of the fixed conductor, said movable conductor being constructed to permit application thereto of an opposing force of adjustable magnitude which tends to move the movable conductor out of such slots, so that when the magnitude of such opposing force becomes sufficient to overcome the electrostatic attraction said movable conductor moves out of such slots with a sudden snap action, and means to indicate the relative magnitude of such opposing force required to produce such snap action.

20. A snap-action electrometer comprising a fixed conductor having a plurality of slots, a plurality of electrically conductive rods, suspension means for supporting said rods so that they may turn about an axis perpendicular to their length, thereby moving in and out of the slots in said fixed conductor, said slotted fixed conductor having a relatively small area of attraction in comparison to the attractive area of said rods, electrical connections for applying potential differences to be measured between said fixed conductor and said rods, means to apply force of adjustable magnitude tending to move said rods out of such slots, and means for indicating relative magnitudes of such force.

21. A snap-action electrometer comprising a slotted fixed conductor, a movable conductor having portions which can move in and out of the slots of said fixed conductor, said slotted fixed conductor having a relatively small area of attraction in comparison to the attractive area of said movable conductor, electrical connections for applying potential differences to be measured between said fixed and movable conductors, whereby electrostatic attraction tends to hold said movable conductor portions within the slots in the fixed conductor, elastic means for applying an opposing force of adjustable magnitude which tends to move such portions out of such slots, and means for indicating relative magnitudes of such opposing force.

22. A snap-action electrometer comprising first and second fixed conductors each having a plurality of slots, a movable conductor including a plurality of parallel electrically conductive rods, said movable conductor being electrically insulated from said fixed conductor and electrically connected to said second fixed conductor, elastic suspension means supporting said rods so that they can turn about an axis substantially perpendicular to the rods and passing through their center of gravity, said conductors being so arranged that when said rods turn about such axis the outer portion of the rods move from positions within the slots of said first fixed conductor to positions within the slots of said second fixed conductor, said elastic suspension providing a torque which tends to produce such movement, and means to adjust the magnitude of such torque.

23. A snap-action electrometer comprising an electrically conductive filament, means supporting said filament for rotation about an axis substantially perpendicular to its length, said axis passing between the ends of said filament, a slotted fixed conductor positioned adjacent to one end of said filament so that such end passes into and out of the slot in said fixed conductor as the filament rotates, said slotted fixed conductor having a relatively small area of attraction in comparison to the attractive area of said filament, a magnetic member attached to the other end of said filament, magnetic means for providing a force of adjustable value acting upon said magnetic member and tending to rotate said filament out of the slot in said fixed conductor, and connections for applying potential differences to be measured between said filament and said fixed conductor.

24. A snap-action electrometer comprising an electrically conductive filament, means supporting said filament for rotation about an axis substantially perpendicular to its length, a fixed conductor including two wires adjacent and parallel to one end of said filament, said two wires defining a slot into and out of which such end of said filament passes as it rotates about said axis, said two wires having a relatively small area of attraction in comparison to the attractive area of said movable conductor, means to provide a force of adjustable value tending to rotate said filament out of such slot, and connections for applying potential differences to be measured between said filament and said fixed conductor.

25. A snap-action electrometer comprising a non-magnetic electrically conductive filament, means supporting said filament for rotation about an axis substantially perpendicular to its length, said axis passing between the ends of said filament, a slotted fixed conductor positioned adjacent to one end of said filament so that such end passes into and out of the slot in said fixed conductor as the filament rotates, said slotted fixed conductor having a relatively small area of attraction in comparison to the attractive area of said filament, a magnetic member attached to the other end of said filament, a magnet positioned to attract said magnetic element in a direction tending to rotate said filament out of the slot in said fixed conductor, calibrated means for adjusting the position of said magnet to vary the force of such attraction, and connections for applying potential differences to be measured between said filament and said fixed conductor.

26. A snap-action electrometer comprising a non-magnetic electrically conductive filament, a suspension supporting said filament for rotation about an axis substantially perpendicular to its length, said axis passing between the ends of said filament, a first fixed conductor including two wires adjacent and parallel to a first end of said filament, said two wires defining a slot into and out of which the first end of said filament passes as it rotates about said axis, a second fixed conductor including two parallel plates defining a slot into which the first end of said filament passes upon passing out of the slot between said two wires, means electrically connecting said second fixed conductor to said filament, a magnet positioned to attract said magnetic element in a direction tending to rotate said filament out of the slot in said first fixed conductor into the slot in said second fixed conductor, calibrated means for adjusting the position of said magnet to vary the force of such attraction, and connections for applying potential differences to be measured between said filament and said fixed conductor.

THEODORE A. RICH.

References Cited in the file of this patent

UNITED STATES PATENTS

| Number | Name | Date |
|---|---|---|
| 1,042,440 | Hubbard | Oct. 29, 1912 |
| 1,114,516 | Price | Oct. 20, 1914 |
| 1,962,849 | Tour | June 12, 1934 |
| 2,221,600 | Nadig et al. | Nov. 12, 1940 |
| 2,303,845 | Krasnow | Dec. 1, 1942 |